G. B. SIMPSON.
INSULATING SUBMARINE CABLES.
No. 65,019.                      Patented May 21, 1867.
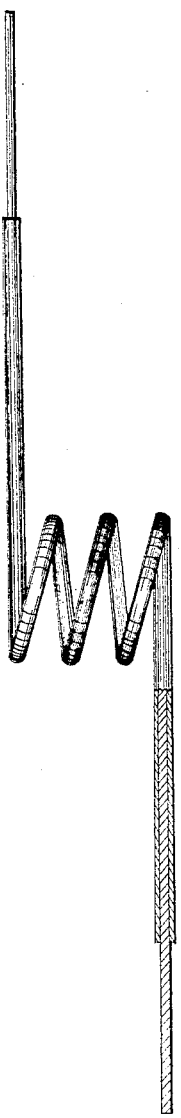
Witnesses:
Inventor:
Geo. B. Simpson

UNITED STATES PATENT OFFICE.

GEORGE B. SIMPSON, OF WASHINGTON, DISTRICT OF COLUMBIA.

IMPROVEMENT IN INSULATING SUBMARINE CABLES.

Specification forming part of Letters Patent No. 65,019, dated May 21, 1867.

*To all whom it may concern:*

Be it known that I, GEORGE B. SIMPSON, of Washington city, in the District of Columbia, have invented a new and useful Improvement in Electrical Conductors for Telegraphic Purposes; and I do hereby declare that the following is a full, clear, and exact description thereof, reference being had to the accompanying drawing, making part of this specification.

To enable others to make and use my submarine telegraph-cable, I will describe its manufacture thus: I dissolve gutta-percha with chloroform, or any other known solvent. I soften gutta-percha in boiling water, steam, or dry heat. I combine gutta-percha with metallic wire by means of a brush, or by immersing the wire in the solution when in the solvent state. I combine gutta-percha and metallic wire with the fingers, or any machine which may facilitate the operation, and execute the work more perfectly by pressing the gum upon and around the wire, or by spinning it out, when in the plastic state, into thin and ribbon-like strips, and twining it on them tightly and continuously around the wire, thus combining the gutta-percha and metallic wire and insulating the wire to any extent. By this mode of combination I cover the wire on all sides with a uniform coating of gutta-percha, of any desired thickness, for the purpose of securing a conductor of electricity within the non-conducting substance, gutta-percha, which combination forms a submarine telegraph-cable, flexible and convenient, which may be suspended on poles in the air, or submerged in water and in the earth. This mode of combination and insulation confines the electric current to the wire, wires, or other conductors of electricity, shielding it and them from contact with any and all external electric, galvanic, or magnnetic influences whatsoever, thus attaining a great triumph in art—namely, the absolute control of electric and galvanic currents for atmospheric and submarine telegraph communication, and for other electric, galvanic, and magnetic uses. (See drawing.)

What I claim as my invention, and desire to secure by Letters Patent of the United States, is—

The combination of gutta-percha and metallic wire in such form as to incase a wire or wires, or other conductors of electricity within the con-conducting substance, gutta-percha, making a submarine telegraph-cable, at once flexible and convenient, which may be suspended on poles in the air or submerged in water and in the earth to any extent for atmospheric and submarine telegraph communication, and for other electric, galvanic, and magnetic uses, as hereinbefore described.

Washington, D. C., May 1, 1866.

GEO. B. SIMPSON.

Witnesses:
   J. F. CALLAN,
   M. P. CALLAN.